US008134562B2

(12) United States Patent
Liang et al.

(10) Patent No.: US 8,134,562 B2
(45) Date of Patent: Mar. 13, 2012

(54) METHOD FOR ASSISTING IN DATA CALCULATION BY USING DISPLAY CARD

(75) Inventors: Chih-Hao Liang, Taipei (TW); Li-Hsiang Liao, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 553 days.

(21) Appl. No.: 12/346,846

(22) Filed: Dec. 31, 2008

(65) Prior Publication Data

US 2009/0174722 A1 Jul. 9, 2009

(30) Foreign Application Priority Data

Jan. 4, 2008 (TW) ................................ 97100344 A

(51) Int. Cl.
*G06F 15/16* (2006.01)

(52) U.S. Cl. ........ 345/503; 345/582; 345/501; 345/504; 345/520; 345/522; 345/536; 345/537; 345/538; 345/552

(58) Field of Classification Search ......................... None
See application file for complete search history.

(56) References Cited

U.S. PATENT DOCUMENTS 7,659,897 B1 * 2/2010 Azar ............................. 345/501

(Continued)

FOREIGN PATENT DOCUMENTS

CN 1431629 7/2003

(Continued)

OTHER PUBLICATIONS

Xiao-Fang Gan, "Video Processing with Color Transfer algorithm Based on GPU", Thesis of Master Degree of Dalian University of Technology, pp. 1-38, Dec. 31, 2006.

(Continued)

*Primary Examiner* — Antonio A Caschera
(74) *Attorney, Agent, or Firm* — Jianq Chyun IP Office

(57) ABSTRACT

A method for assisting in data calculation by using a display card: In the present method, input data stored in a system memory is transformed into texture data, which is then stored in a display memory of the display card. Then, a Graphic processing unit (GPU) of the display card is used for executing a texture calculation to the texture data, and a result of the texture calculation is stored in a display target of the display memory. Finally, the display target is outputted to the system memory as the output data. Accordingly, a part of calculation tasks of a central processing unit (CPU) can be given to the GPU of the display card when the CPU is in a high usage rate, so as to reduce a calculation burden of the CPU.

11 Claims, 3 Drawing Sheets

U.S. PATENT DOCUMENTS 7,800,620 B2 * 9/2010 Tarditi et al. .................. 345/505

FOREIGN PATENT DOCUMENTS

| | | |
|---|---|---|
| TW | 571190 | 1/2004 |
| TW | 200620151 | 6/2006 |
| TW | 200731159 | 8/2007 |

OTHER PUBLICATIONS

"1st Office Action of China Counterpart Application", issued on Oct. 20, 2010, p. 1-p. 4.

"Office Action of Taiwan Counterpart Application", issued on Jun. 21, 2011, p. 1-p. 9.

* cited by examiner

METHOD FOR ASSISTING IN DATA CALCULATION BY USING DISPLAY CARD

CROSS-REFERENCE TO RELATED APPLICATION

This application claims the priority benefit of Taiwan application serial no. 97100344, filed on Jan. 4, 2008. The entirety of the above-mentioned patent application is hereby incorporated by reference herein and made a part of this specification.

BACKGROUND OF THE INVENTION

1. Field of the Invention

The present invention relates to a method for data calculation. More particularly, the present invention relates to a method for assisting in data calculation by using a display card.

2. Description of Related Art

A central processing unit (CPU) is a main tool of a computer for executing calculations. Besides the CPU, to meet an increasing demand of drawing, a display card disposed on a motherboard is generally equipped with an independent graphic processing unit (GPU) and a display memory, so as to accelerate a drawing speed. During drawing of the display card, texture data is first obtained to execute a texture-related calculation, and then a calculation result is displayed on a target.

In detail, FIG. 1 is a flowchart illustrating a conventional drawing method by using a display card. FIG. 2 is a schematic diagram illustrating a conventional drawing method by using a display card. Referring to FIG. 1 and FIG. 2, textures used for drawing are set first (step S110), in which the textures can be an image or a pattern, for example, the textures 210 and 220 of FIG. 2. Next, a texture calculation to be executed is set (step S120). The texture calculation may be executed via a program written with pixel shader codes, for example, the texture calculation 230 of FIG. 2. Next, an output target of the calculation is set (step S130), for example, the target 240 shown in FIG. 2. The aforementioned set textures or target can be respectively regarded as a part of a display memory, and range definitions of the textures and the target required for the texture calculation have to be set before the texture calculation (step S140). During the texture calculation, the GPU of the display card obtains a pixel value of a certain pixel from the textures for texture calculation, and then outputs a calculation result to a corresponding pixel on the target (step S150).

With the development of technology, data required to be processed by the computer is greatly increased, to meet such a demand, it seems to have no other solutions besides applying a high-efficiency CPU. However, as described above, the GPU of the display card actually has a powerful calculation capability, and if such calculation capability can be appropriately utilized during an idle time thereof, a part of calculation tasks of the CPU can be shared by the GPU so as to reduce a usage rate of the CPU, which is come to an idea of the present invention.

SUMMARY OF THE INVENTION

Accordingly, the present invention is directed to a method for assisting in data calculation by using a display card, by which calculation tasks originally executed by a system CPU are transformed into data and program codes that can be executed by GPU of the display card and a part of the system tasks is transferred to the display card for calculation, so that a usage rate of the system CPU is reduced.

The present invention provides a method for assisting in data calculation by using a display card, which is suitable for calculating system input data by using the display card to obtain output data. The display card includes a first processing unit and a display memory, and the system includes a second processing unit and a system memory. The method includes following steps. First, the input data is transformed into texture data and is stored in the display memory. Next, a texture calculation is performed to the texture data by the first processing unit, and a result of the texture calculation is stored in a display target of the display memory. Finally, the display target is outputted to the system memory as the output data.

In an embodiment of the present invention, before the step of transforming the input data of the system memory into the texture data and storing it in the display memory, the method further includes detecting a usage rate of the second processing unit of the system; judging whether the usage rate is greater than a predetermined standard; and performing a follow up operation to transfer the input data to the first processing unit for calculation, when the usage rate is greater than the predetermined standard.

In an embodiment of the present invention, the texture data is stored in a first block of the display memory, and the display target is stored in a second block of the display memory.

In an embodiment of the present invention, the step of executing the texture calculation to the texture data by using the first processing unit includes following steps. First, the first block is set as a texture source to be referred to during drawing of the first processing unit. Then, the second block is set as an output target for drawing of the first processing unit. Finally, the texture calculation is executed by using the first processing unit with reference of the texture source.

In an embodiment of the present invention, the step of transforming the input data into the texture data, and storing it in the display memory includes following steps. First, image data is transformed into first texture data, in which the image data includes pixel values of a plurality of pixels of an image. Next, positions of the pixels to be referred to during the texture calculation in the image are transformed into second texture data. Finally, the first texture data and the second texture data are stored in the display memory.

In an embodiment of the present invention, the step of executing the texture calculation to the texture data by using the first processing unit includes following steps. First, the first texture data is read to obtain the positions of the pixels to be referred to during the texture calculation in the image. Next, the second texture data is read with reference of the positions of the pixels in the image to obtain the pixel values of the pixels to be referred to during the texture calculation. Finally, the texture calculation is executed with reference of the pixel values of the pixels.

In an embodiment of the present invention, the texture data includes pixel values of a plurality of pixels of an image and positions of the pixels in the image.

In an embodiment of the present invention, the step of executing the texture calculation to the texture data by using the first processing unit includes following steps. First, a calculation program code executed by the second processing unit is transformed into a pixel shader code that can be executed by the first processing unit. Next, the pixel shader code is executed to read the texture data, and a drawing result is obtained via calculation. Finally, the drawing result is output to the display target.

In an embodiment of the present invention, the texture calculation includes performing one of image processing, encrypting, decrypting, compressing and decompressing to the input data.

In an embodiment of the present invention, a size of the texture data of each of the pixels is four bytes.

In an embodiment of the present invention, the first processing unit is a graphic processing unit (GPU), and the second processing unit is a central processing unit (CPU).

In the present invention, a structure of sharing the system tasks by using the display card is provided, by which when a calculation load of the system is too high, a part of the system tasks is transformed into the data and the program codes that can be executed by the GPU of the display card. Then, after calculation of the GPU, the calculation result is output to the system memory, so as to assist in completing a part of the system tasks, so that calculation burden of the system CPU can be reduced.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Generally, a full algorithm includes three parts: data input, execution process and result output. The algorithm calculation is generally perform by a CPU of a computer, and if the algorithm calculation is about to be handed to the display card for execution, the above three parts of data then have to be suitably adjusted or format conversion thereof has to be performed, so as to meet a demand for processing data by using the display card. The present invention provides a method for assisting in data calculation by using a display card based on the above concept. To fully convey the spirit of the present invention to those skilled in the art, embodiments are provided below for detailed description.

Figure 1:
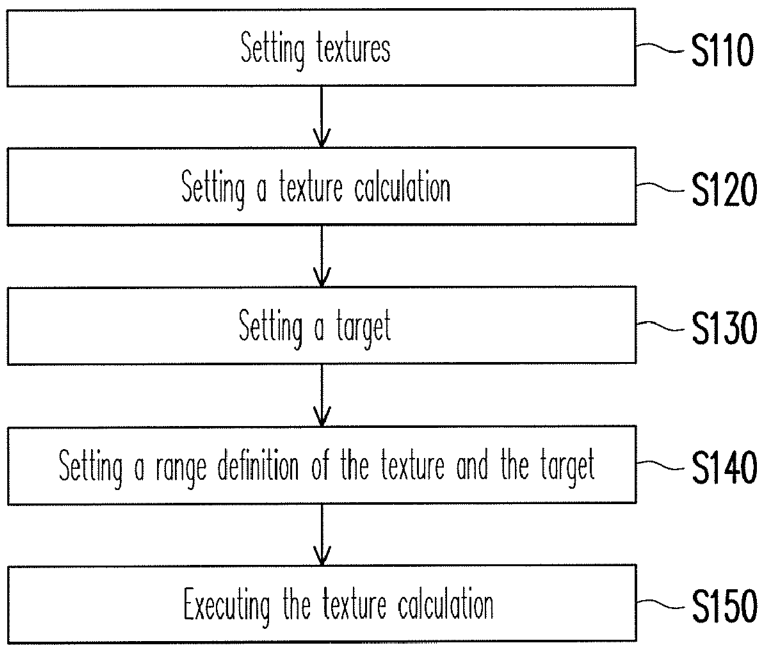
FIG. 1 (PRIOR ART)
FIG. 1 is a flowchart illustrating a conventional drawing method of a display card.
Figure 2:
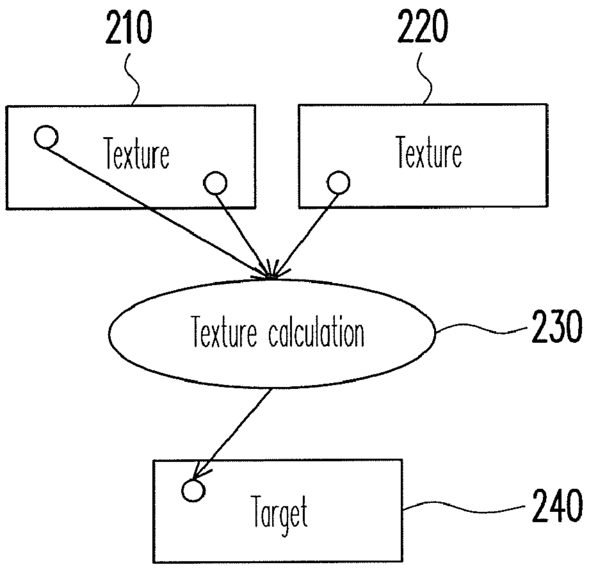
FIG. 2 (PRIOR ART)
FIG. 2 is a schematic diagram illustrating a conventional drawing method of a display card.
Figure 3:
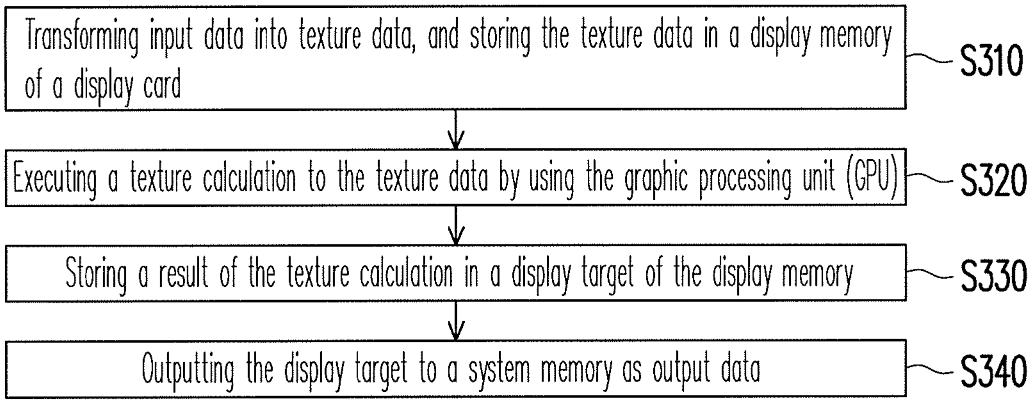
FIG. 3 is a flowchart illustrating a method for assisting in data calculation by using a display card according to an embodiment of the present invention.

FIG. 3 is a flowchart illustrating a method for assisting in data calculation by using a display card according to an embodiment of the present invention. Referring to FIG. 3, in the present embodiment, by utilizing the characteristics of "obtaining texture data", "performing texture-related calculation", and "drawing the calculation result on a target" performed during drawing of the display card, tasks originally handled by the CPU are transferred to the display card for calculation through format conversion, so as to reduce a calculation burden of the CPU.

In detail, in the present embodiment, a graphic processing unit (GPU) of a display card is utilized to substitute the CPU for processing the system input data, and after the calculation, a calculation result is transferred back to the system and served as output data. The aforesaid display card includes a GPU and a display memory, and the system includes a CPU and a system memory. In the following, detailed steps of the present embodiment are described.

First, the input data is transformed into texture data by using the CPU, and is stored in the display memory of the display card (step S310). In detail, since during the drawing of the display card, information of any point on the texture can be obtained, as long as a sequence thereof is suitably arranged, the texture then can be regarded as a block of memory stored with the input data. In most cases, the block of memory is the display memory of the display card, and now the input data stored in the system memory is moved into the texture (memory) by using a three-dimensional application programming interface (API), for example, Direct 3D, and the texture is set as a reference for drawing of the display card. Accordingly, the display card can perform the drawing with reference of the input data stored in the texture.

After the texture data is ready, the GPU then executes the texture calculation to the texture data (step S320). This step represents an actual data calculation process, in which the texture calculation can be executed includes image processing of the input data, or other processes such as encrypting, decrypting, compressing and decompressing, which is not limited by the present invention.

It should be noted that in the present embodiment, pixel shader codes are applied for obtaining the texture data, executing certain calculations and outputting the calculation result to a display target. By utilizing the three-dimensional API, the pixel shader code is set as program code that can be called by the GPU during the drawing, so that the program code is called each time when the display card draws a pixel. A size of the texture data of the pixel called each time is, for example, four bytes, and data amount output to the display target is also four bytes, which is not limited by the present invention.

Next, the result of the texture calculation is stored in a display target of the display memory (step S330). The so-called display target has to be a block of display memory, and here the display target can also be set as an output destination of the display card by using the three-dimensional API. In detail, the texture data is, for example, stored in a first block of the display memory, and the display target is stored in a second block of the display memory. When the GPU executes the texture calculation, the first block can be set as a texture source to be referred to during the drawing, and the second block can be set as the output destination for the drawing. Then, the required texture calculation is executed with reference of the set texture source.

Finally, the display target is output to the system memory and served as the output data (step S340) for completing the data calculation. The output data then can be regarded as a calculation result originally obtained by processing the input data stored in the system memory via the CPU. By such means, a part of calculation tasks of the CPU is transferred to the GPU, so that a calculation burden of the CPU is reduced.

As described above, a main purpose of the present invention is to assist in data calculation of the system CPU by using the GPU of the display card, and a utilization opportunity thereof is when the CPU is in a high usage rate, and then a part of the calculation tasks can be transferred to the GPU. Therefore, before the GPU is utilized for assisting in calculation, the usage rate of the system CPU is detected first, and whether the usage rate is higher than a predetermined standard is judged. When the usage rate is greater than the predetermined standard, the CPU is then judged to be overloaded, and the assistance is required. At this time, the aforementioned steps such as data format conversion and texture calculation are performed, so as to transfer the input data to the GPU for calculation and reduce the calculation burden of the CPU.

To fully convey the spirit of the present invention, in the following, a color space conversion is taken as an example with reference of figures for describing the method of the present invention in detail.

Figure 4:
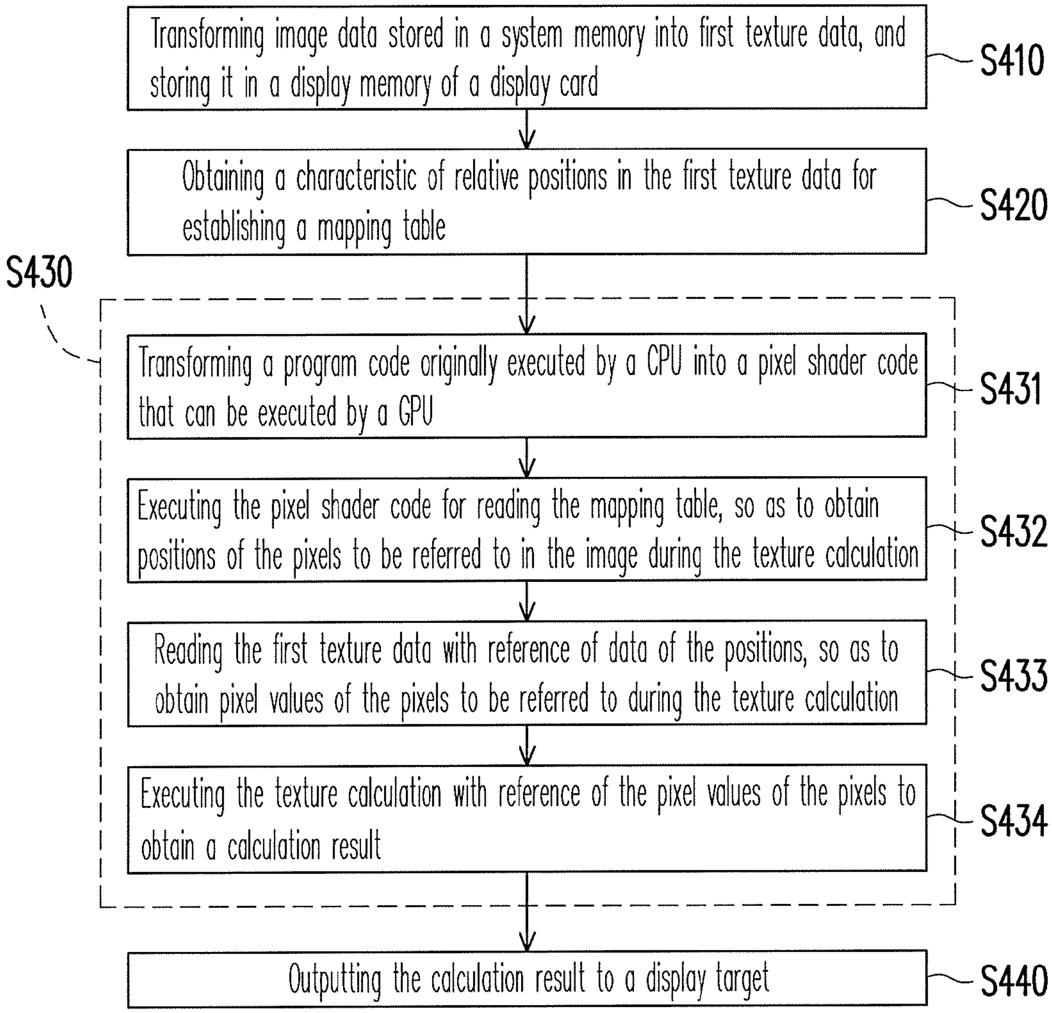
FIG. 4 is a flowchart illustrating a method for assisting in data calculation by using a display card according to another embodiment of the present invention.

FIG. 4 is a flowchart illustrating a method for assisting in data calculation by using a display card according to another embodiment of the present invention. Referring to FIG. 4, in the present embodiment, a color space of a certain picture stored in the system memory is converted from an ARGB format to a YUY2 format. In the ARGB format, data of each pixel occupies 4 bytes, and in the YUY2 format, data of each two pixels occupies 4 bytes. Since the 4 bytes are taken as a unit during drawing of the GPU, two YUY2 pixels have to be drawn at a time. A flow of transferring the system tasks to the display card for calculation is as follows:

First, the image data stored in the system memory is transformed into first texture data, stored in the display memory of the display card, and set as a texture source (step S410). Since information of any point on the texture can be obtained during drawing of the display card, as long as a sequence thereof is suitably arranged, the first texture data then can be regarded as a block of memory stored with the input data.

Next, characteristic of relative positions in the first texture data is obtained by using the three-dimensional API, and a mapping table is established to serve as another texture source (which can be regarded as second texture data) (step S420). A main function of the mapping table is to assist the GPU to obtain correct texture positions, so as to search required data for the calculation.

After conversion and establishment of the texture data required by the texture calculation are completed, the GPU then executes the texture calculation to the texture data (step S430). The step S430 can be further divided into following steps.

First, a program code originally executed by the CPU is transformed into a pixel shader code that can be executed by the GPU (step S431). Next, the pixel shader code is executed for reading the mapping table stored in the display memory, so as to obtain positions of the pixels to be referred to in the image during the texture calculation (step S432). By referring to the position data, the first texture data can be further read, so as to obtain pixel values of the pixels to be referred to during the texture calculation (S433). Finally, the texture calculation is executed with reference of the pixel values to obtain a calculation result (step S434).

As described above, the texture data can be the pixel values of a plurality of pixels within an image (for example, the second texture data), or the positions of the pixels in the image (for example, the first texture data), which is not limited by the present invention. After the texture calculation is completed, the calculation result is output to the display target (step S440) to complete the color space conversion.

Figure 5:
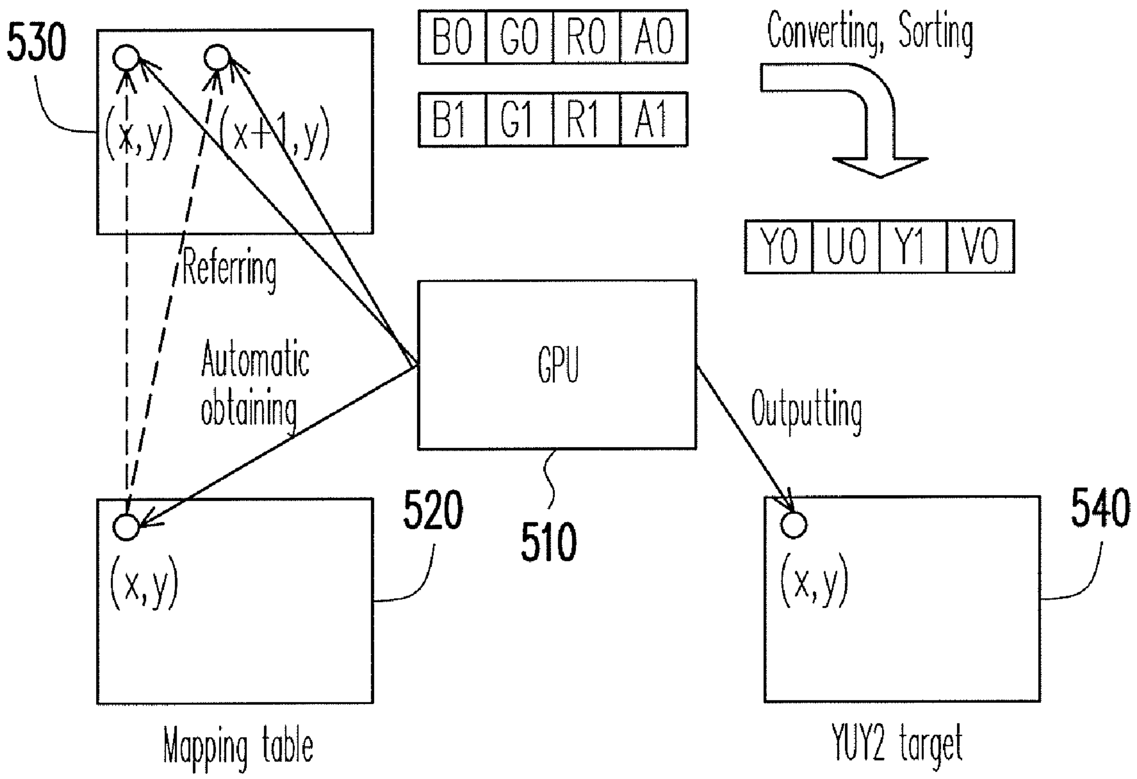
FIG. 5 is a schematic diagram illustrating an example of assisting in data calculation by using a display card according to another embodiment of the present invention.

For example, FIG. 5 is a schematic diagram illustrating an example of assisting in data calculation by using a display card according to another embodiment of the present invention. Referring to FIG. 5, assuming a pixel (for example, (x, y)) is about to be generated on a YUY2 target 540, the texture data corresponding to the pixel is then obtained from a mapping data 520 by a GPU 510, in which the texture data is, for example, coordinates of two corresponding pixels (for example, (x, y) and (x+1, y)) in the ARGB texture 530. Accordingly, the GPU 510 can read the pixel values (including RGB values) of the corresponding two pixels in the ARGB texture 530 with reference of the coordinates obtained from the mapping table 520, and then converts the pixel values into YUV values, arranges the YUV values according to a defined sequence of the YUY2 format (for example, Y0, U0, Y1, V0), and then outputs the YUV values to the YUY2 target 540. Finally, the YUY2 format image in the YUY2 target 540 is output to the system memory (not shown) through the three-dimensional API, so as to complete the color space conversion.

It should be noted that, in the above embodiment, an image and positions of pixels in the image are regarded as the texture data to be referred to during the texture calculation of the GPU. However, those skilled in the art should understand that other types and numbers of the texture data can also be applied according to actual requirement of the texture calculation, so as to achieve a purpose of diversified calculation. In other words, as long as a suitable data conversion is performed, work threads originally executed by the CPU can be transferred to the GPU for processing, so as to share the calculation burden of the CPU.

In summary, the method for assisting in data calculation by using the display card has at least the following advantages:

1. The calculation capability and memory of the display card can be utilized to assist in a part of the calculation tasks of the CPU, so as to effectively reduce the usage rate of the CPU.

2. Various data such as image data or pixel positions can be set as the texture data to be referred to during the texture calculation, so as to provide a flexible range for the texture calculation.

3. By detecting the usage rate of the CPU, a substitute approach is provided to share the calculation burden of the CPU when it is overloaded, so that problems such as delay of processing procedure caused by overload of the CPU can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for assisting in data calculation by using a display card, suitable for applying a display card to calculate input data of a system to obtain output data, wherein the display card comprises a first processing unit and a display memory, and the system comprises a second processing unit and a system memory, the method comprising:

transforming the input data into texture data, and storing the texture data in the display memory; wherein the step of transforming the input data into the texture data, and storing it in the display memory comprises:

transforming image data into first texture data, wherein the image data comprises pixel values of a plurality of pixels of an image;

transforming positions of the pixels to be referred to in the image into second texture data during a texture calculation; and storing the first texture data and the second texture data in the display memory;

executing a texture calculation of the texture data by using the first processing unit;

storing a result of the texture calculation in a display target of the display memory; and outputting the display target to the system memory as the output data.

2. The method for assisting in data calculation by using a display card as claimed in claim 1, wherein before the step of transforming the input data of the system memory into the texture data and storing it in the display memory, the method further comprises:

detecting a usage rate of the second processing unit of the system; and judging whether the usage rate is greater than a predetermined standard, when the usage rate is greater than the predetermined standard, performing a follow up operation to transfer the input data to the first processing unit for calculation.

3. The method for assisting in data calculation by using a display card as claimed in claim 1, wherein the texture data is stored in a first block of the display memory, and the display target is stored in a second block of the display memory.

4. The method for assisting in data calculation by using a display card as claimed in claim 3, wherein the step of executing the texture calculation to the texture data by using the first processing unit comprises:

setting the first block as a texture source to be referred to during drawing of the first processing unit;

setting the second block as an output target for drawing of the first processing unit; and executing the texture calculation by using the first processing unit with reference to the texture source.

5. The method for assisting in data calculation by using a display card as claimed in claim 1, wherein the step of executing the texture calculation to the texture data by using the first processing unit comprises:

reading the first texture data to obtain the positions of the pixels to be referred to in the image during the texture calculation;

reading the second texture data with reference of the positions of the pixels in the image to obtain the pixel values of the pixels to be referred to during the texture calculation; and executing the texture calculation with reference of the pixel values of the pixels.

6. The method for assisting in data calculation by using a display card as claimed in claim 1, wherein the texture data comprises pixel values of a plurality of pixels of an image and positions of the pixels in the image.

7. The method for assisting in data calculation by using a display card as claimed in claim 1, wherein the step of executing the texture calculation of the texture data by using the first processing unit comprises:

transforming a calculation program code executed by the second processing unit into a pixel shader code that can be executed by the first processing unit;

executing the pixel shader code to read the texture data, and calculating to obtain a drawing result; and outputting the drawing result to the display target.

8. The method for assisting in data calculation by using a display card as claimed in claim 1, wherein the texture calculation comprises performing one of image processing, encrypting, decrypting, compressing and decompressing of the input data.

9. The method for assisting in data calculation by using a display card as claimed in claim 1, wherein a size of the texture data of each of the pixels is four bytes.

10. The method for assisting in data calculation by using a display card as claimed in claim 1, wherein the first processing unit is a graphic processing unit (GPU).

11. The method for assisting in data calculation by using a display card as claimed in claim 1, wherein the second processing unit is a central processing unit (CPU).

* * * * *